No. 857,303. PATENTED JUNE 18, 1907.
G. RICHARDS.
BELT PULLEY.
APPLICATION FILED AUG. 9, 1905.

WITNESSES:
L. A. Berry
Fredk W. Myers

INVENTOR
George Richards

UNITED STATES PATENT OFFICE.

GEORGE RICHARDS, OF PHILADELPHIA, PENNSYLVANIA.

BELT-PULLEY.

No. 857,303.

Specification of Letters Patent.

Patented June 18, 1907.

Application filed August 9, 1905. Serial No. 273,498.

*To all whom it may concern:*

Be it known that I, GEORGE RICHARDS, a citizen of the United States, and a resident of the city and county of Philadelphia, State of Pennsylvania, have invented an Improvement in Belt-Pulleys, of which the following is a specification.

The invention relates to that type of composite metal belt pulley, whether a "whole" or a "split" pulley, in which the rim is made from a bent plate or plates encircling the arms of the pulley, particularly when such arms are made from rolled bars of channel section. The object of the invention is to provide a simple and reliable means of securing the arm to the rim at the joint between the abutting ends of the rim or rim sections.

The type of composite metal pulleys to which my invention more particularly relates included two forms, known as "whole" pulleys and "split" pulleys, and consists of two alining hubs or hub sections, made of steel castings; a series of pairs of arms made from rolled bars of channel section, the two arms of each pair being secured, at their inner ends, to the two hub-sections respectively, and at their outer ends bent oppositely at right angles and parallel with the pulley-axis; and a rim, bent to a circular shape, to which the outer bends of the arms are attached. In whole pulleys, the hub sections are each solid in one piece, and the rim, made either solid in one piece and with but a single joint, or in two halves with two joints, is permanently attached to the arms. In split pulleys the hub sections are each made in two halves, bolted together, and the rim is also made in two halves that are removably clamped together at the two joints.

My invention, which is more particularly applicable to whole pulleys, consists of common securing means, hereinafter described, for holding together the abutting ends of the curved plate or plates of which the rim is formed and for attaching the arms to the rim at such abutting ends.

Figure 1:
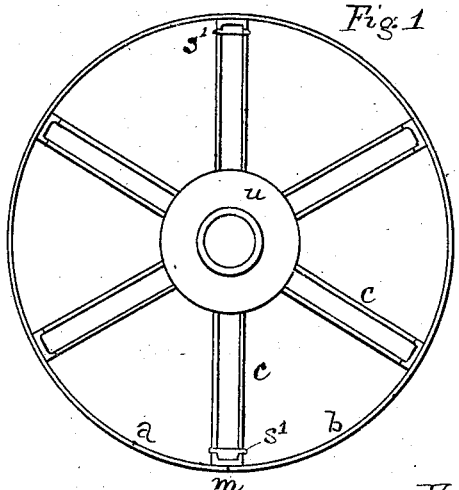
Figure 2:
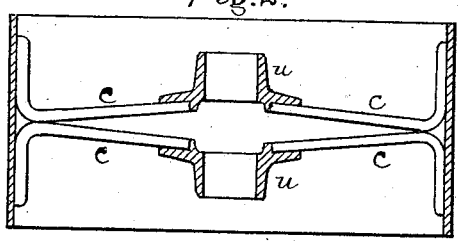
Figure 3:
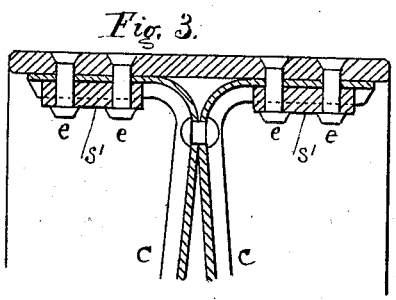
Figure 4:
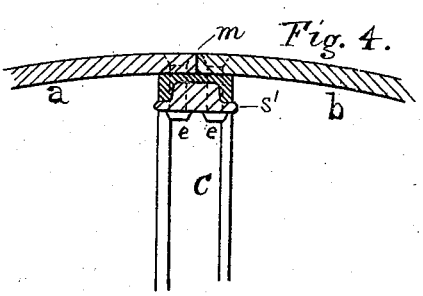
Figure 5:
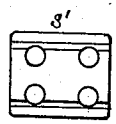

In the drawings: Figure 1 is a side elevation of a whole pulley embodying my invention. Fig. 2 is a transverse section through the pulley. Fig. 3 is an enlarged detail sectional view taken transversely through a part of the pulley and showing the rim, arms and securing means. Fig. 4 is an enlarged detail sectional view of the parts illustrated in Fig. 3, the section being taken at right angles to that of Fig. 3. Fig. 5 is a plan view of one of the clips.

$u, u,$ are the hub sections.

$c, c$ are the pulley arms.

$m$ is the joint at the abutting ends $a, b$ of the rim.

$s'$ are clips inserted in the channels of the arms.

$e, e,$ etc are bolts extending through the clips, arms, and abutting ends of the rim, one row of bolts extending on one side of the joint $m$ and another row of bolts on the other side of the joint $m.$ The clips extend above the channels of the arms and side flanges thereon overlie the side flanges of the arms. The joint $m,$ it will be seen, extends opposite the longitudinal center of the outward bends of the arms. The clips are cut to the desired length from rolled bars of a size and section to fit the channel bars from which the arms are cut. By means of the clips, there is provided a surface sufficiently wide to support the heads of both rows of rivets, and at the same time permit the rivets to be properly spaced apart.

On pulleys of medium width, one clip is employed on each side of the rim joint, but on wider pulleys, two or more clips may be used.

When the pulleys are of medium diameter, the rim is made in one piece and rolled to a circle with but a single joint $m.$ In such a pulley, other clips $s',$ of similar size and shape to those already described, are attached to the arms and rim at a point diametrically opposite the joint of the rim, so that the weight on opposite sides of the rim may be equal, whereby perfect balance of the pulley when rotating is maintained.

Having now fully described my invention, what I claim and desire to protect by Letters Patent is:

1. In a composite belt pulley, the combination with the hub, of a rim having at least one joint and pairs of arms extending from the hub, whose outer ends are bent away from each other toward the pulley edges, and underlie and support the rim, a pair of arms extending approximately beneath said joint, a clip underlying the bent outer ends of each arm and two rivets extending through the rim, clip and arm, one rivet engaging the rim on one side of said joint and the other rivet engaging the rim on the other side of said joint.

2. In a composite belt pulley, the combination with the hub, of a rim having at least one joint, channel arms extending from the hub, whose outer ends are bent away from each other toward the pulley edges and underlie and support the rim, one at least of said arms extending underneath said joint, a clip fitting within the channels of the bent outer end of said arm, and rivets extending through the clip and arm and through the rim on opposite sides respectively of said joint.

In testimony whereof, I have signed my name to this specification in the presence of two subscribing witnesses.

GEO. RICHARDS.

Witnesses:
L. H. BERRY,
FREDK. W. MYERS.